(12) United States Patent
Shaffer

(10) Patent No.: US 6,672,062 B2
(45) Date of Patent: Jan. 6, 2004

(54) MULTI-STAGE SUPERCHARGER ARRANGEMENT WITH CROSS FLOW

(75) Inventor: Bradley J. Shaffer, Romney, IN (US)

(73) Assignee: Caterpillar Inc, Peoria, IL (US)

( * ) Notice: Subject to any disclaimer, the term of this patent is extended or adjusted under 35 U.S.C. 154(b) by 0 days.

(21) Appl. No.: 10/036,964

(22) Filed: Dec. 21, 2001

(65) Prior Publication Data

US 2003/0115876 A1 Jun. 26, 2003

(51) Int. Cl.[7] .............................................. F02B 33/44
(52) U.S. Cl. ..................... 60/612; 60/728; 60/39.183
(58) Field of Search .................... 60/612, 792, 728, 60/39.183; 123/562; 415/179, 60, 66, 67; 165/152

(56) References Cited

U.S. PATENT DOCUMENTS

| 2,513,601 A | * | 7/1950 | Traupel | 60/39.183 |
|---|---|---|---|---|
| 2,543,677 A | * | 2/1951 | Traupel | 60/792 |
| 2,654,216 A | * | 10/1953 | Traupel | 60/39.183 |
| 5,062,477 A | * | 11/1991 | Kadle | 165/152 |
| 5,101,891 A | * | 4/1992 | Kadle | 165/152 |
| 5,157,924 A | | 10/1992 | Sudmanns | |
| 5,442,904 A | * | 8/1995 | Shnaid | 60/39.183 |
| 5,724,806 A | * | 3/1998 | Horner | 60/728 |
| 5,937,633 A | * | 8/1999 | Wang | 60/728 |
| 6,050,080 A | * | 4/2000 | Horner | 60/728 |

* cited by examiner

*Primary Examiner*—Thomas Denion
*Assistant Examiner*—Thai-Ba Trieu
(74) *Attorney, Agent, or Firm*—Finnegan, Henderson, Farabow, Garrett & Dunner

(57) ABSTRACT

A supercharger arrangement, having a first rotor assembly, including a first compressor with a first compressor inlet and a first compressor outlet, and a second compressor with a second compressor inlet and a second compressor outlet. The supercharger arrangement also having a second rotor assembly, including a third compressor with a third compressor inlet and a third compressor outlet, and a fourth compressor with a fourth compressor inlet and a fourth compressor outlet; and a first inter-stage conduit that communicates the first compressor outlet with the fourth compressor inlet so that flow from the first compressor feeds into the fourth compressor.

18 Claims, 4 Drawing Sheets

Fig_4_
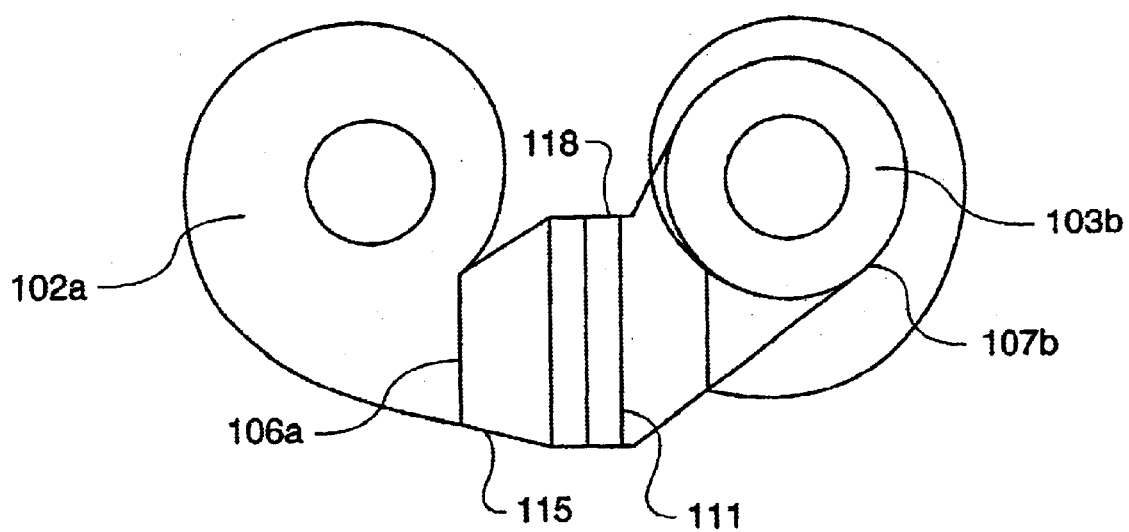

MULTI-STAGE SUPERCHARGER ARRANGEMENT WITH CROSS FLOW

TECHNICAL FIELD

This invention relates generally to turbo-machinery, and in particular to a multi-stage supercharger arrangement with cross flow between compression stages.

BACKGROUND

Emissions regulations and market forces have continually driven engine manufacturers toward higher engine output, smaller overall size, and cleaner operation. Currently designers of state of the art internal combustion engines concentrate on the few tools still available to meet these challenges. A current area of focus for engine designers is the engine air system, and, more particularly, the combustion engine's turbomachinery or turbochargers.

State of the art combustion systems require the engine's air and fuel to be delivered to the combustion chamber at increasingly higher pressure and higher mass flow. With the desire to provide higher combustion air pressure (i.e., "boost" pressure), engine manufacturers have used series turbocharger arrangements. These arrangements dispose two separate turbocharger assemblies on the engine, each having a compressor driven by its own turbine and designed to provide a predetermined portion of the overall required pressure ratio with the output of one turbocharger assembly (first stage) feeding the input of the other turbocharger assembly (second stage). Such arrangements allow each turbocharger assembly to be individually optimized for best performance. Often, the engine may have more than one series turbocharger arrangement adapted to deliver air to some subset of combustion cylinders. Cooling the partially compressed air between the first and second stage further improves efficiency.

Another turbocharger arrangement is the twin compressor turbocharger ("TCT"). U.S. Pat. No. 5,157,924 discloses an example of a turbocharging system that employs the TCT arrangement. An important feature of the TCT arrangement is the mounting of two compressor wheels (first and second stage wheels) on a common rotor shaft. Ducting internal to the device routes the partially compressed air output from the first stage wheel to the inlet of the second stage wheel. TCTs have fewer rotor assemblies on the engine compared with a series turbocharger arrangement and reduce bearing and shaft losses.

Similar with series turbocharger arrangements, TCTs may also have inter-stage cooling. One manner of inter-stage cooling uses a generally annular cooler disposed about the rotor shaft. The overall layout of the air flow passageways directing air into the annular cooler, as well as toward the second stage compressor inlet generally requires a larger package for the rotor housing. Where the mass flow and pressure performance characteristics of the compressor and turbine wheels increase with the square of rotor speed and diameter, thermal heat transfer considerations increase directly (i.e., linearly) with increased mass flow. The mismatch of square turbo performance and linear heat transfer effects makes inter-stage cooled TCTs an essentially non-scalable, turbo-machinery device. Large mass flow and high-pressure applications for TCT technology result in moderate diameter wheels but very large cooler sizes, and, consequently, a very large outside diameter of the rotor housing.

The cooler also generally dictates the axial length of the TCT's compressor section. The overall efficiency of a series turbocharger arrangement is strongly dependent on incurring little or no losses in pressure in the inter-stage ducting. This efficiency requirement drives design of a very low pressure-drop cooler core. The low pressure-drop cooler core in turn requires slowing the airflow down to minimum velocity over the largest possible area (longest axial length, largest outside diameter).

Additionally, measured against traditional inter-stage cooled series turbocharger arrangements, the inter-stage cooled TCT device generally can devote less space and length to smoothly transition the inter-stage airflow, since the air must flow from the first stage compressor outlet, through the cooler, and toward the second stage inlet. The resulting small airflow cross sections, sharp turning radii, and abrupt expansions and contractions significantly decrease the inter-stage cooled TCT's efficiency.

Moreover, balancing the diameter, length, and airflow ducting requirements noted above, generally results in the designer reducing the amount of cooler heat transfer capability of the TCT machine and increasing the interstate cooled temperature fed into the second stage inlet. This increase in interstate temperature again decreases the TCT's efficiency.

The present invention is directed to overcoming one or more of the problems as set forth above.

SUMMARY OF THE INVENTION

In one aspect of the present invention, a supercharger arrangement includes a first rotor assembly, including a first compressor, having a first compressor inlet and a first compressor outlet. A second compressor has a second compressor inlet and a second compressor outlet. A second rotor assembly includes a third compressor, having a third compressor inlet and a third compressor outlet, and a fourth compressor, having a fourth compressor inlet and a fourth compressor outlet. A first inter-stage conduit connects the first compressor outlet and the fourth compressor inlet.

According to another aspect of the invention, a supercharged engine has a combustion chamber. An intake conduit is connected with the combustion chamber. Also, an exhaust conduit connects with the combustion chamber. The supercharged engine includes supercharger arrangement having a first rotor assembly, including a first compressor and a second compressor. A second rotor assembly includes a third compressor and a fourth compressor. An inter-stage conduit connects an outlet of the first compressor with an inlet of the fourth compressor.

According to yet another aspect of the present invention, a method of compressing gas is provided, including compressing a first gas to a first compression stage using a first compressor wheel; further compressing the first gas to a second compression stage using a fourth compressor wheel; compressing a second gas to the first compression stage using a third compressor wheel; and further compressing the second gas to the second compression stage using a second compressor wheel.

BRIEF DESCRIPTION OF THE DRAWINGS

FIG. 4 is an outline view of part of the supercharger arrangement showing the rectilinear flow configuration of the heat exchanger.

DETAILED DESCRIPTION

Figure 1:
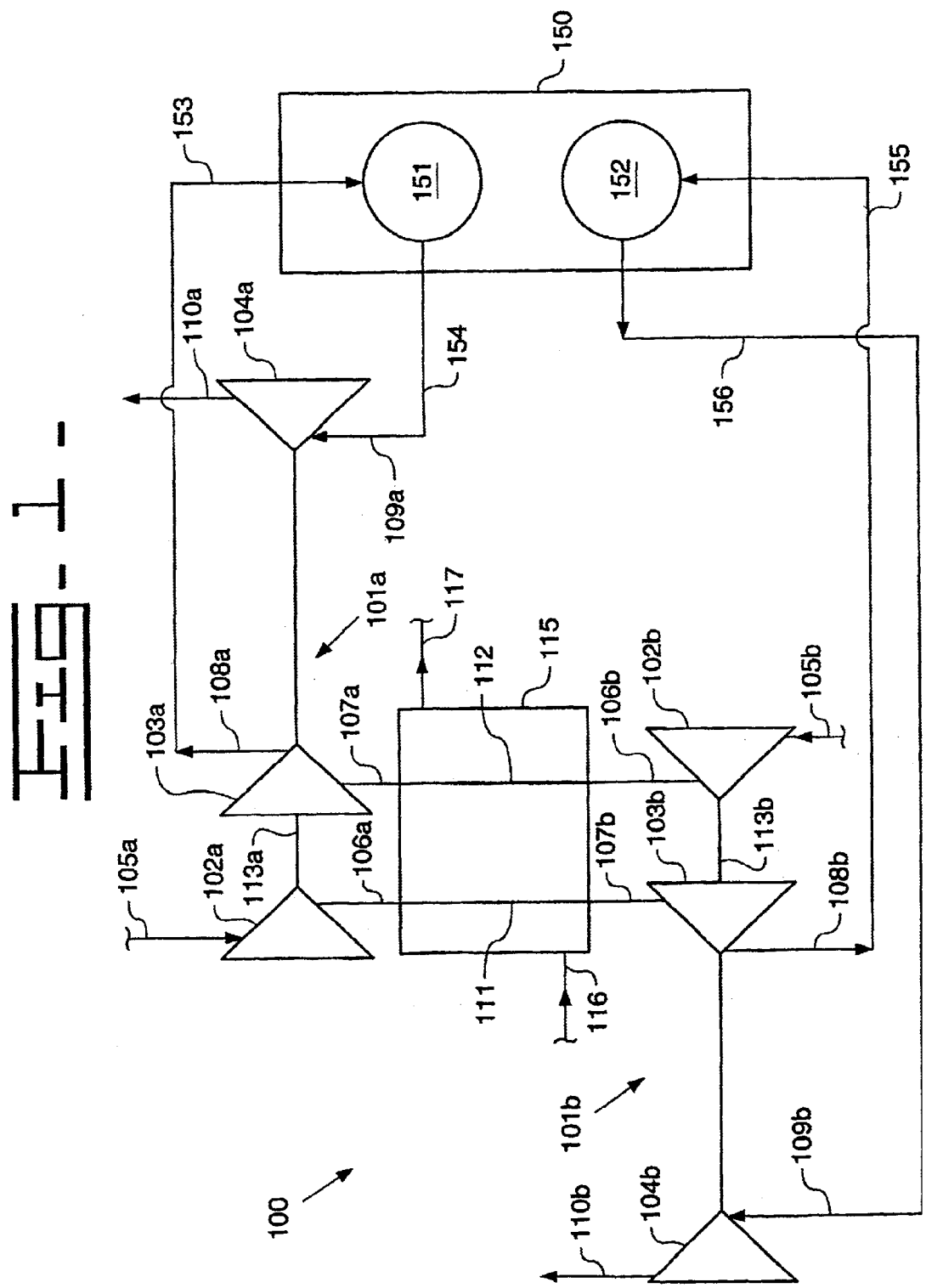
FIG. 1 is a schematic diagram of a supercharger arrangement in accordance with a first embodiment of the invention.

As shown in FIG. 1, a supercharging system 100 in accordance with a first embodiment of the present invention includes a first rotor assembly 101a and a second rotor assembly 101b. A first stage compressor 102a (first compressor) is mounted on the first rotor assembly 101a, and a first stage compressor 102b (third compressor) is mounted on the second rotor assembly 101b. A second stage compressor 103a (second compressor) is mounted on the first rotor assembly 101a, and a second stage compressor 103b (fourth compressor) is mounted on the second rotor assembly 101b. In an embodiment, the first and second stage compressors 102a–103b have an axial flow inlet and radial flow outlet. However the present invention will also work with the compressors 102a–103b using other flows such as axial inlet and outlet or mixed inlet and radial outlet. The first stage compressor 102a has an inlet 105a and an outlet 106a fluidly connecting with an inlet 107b of the second stage compressor 103b. An inter-stage conduit 111 fluidly connects between the first stage compressor outlet 106a and the second stage compressor inlet 107b. The second stage compressor 103b has an outlet 108b fluidly connecting with a combustion chamber 152 or engine block 150. An intake conduit 155 fluidly connects between the second stage compressor outlet 108b and the combustion chamber 152. While the engine block 150 is shown defining only two combustion chambers 151, 152, any conventional engine configuration with any number of combustion chambers may be used with the present invention such as a "V", radial, or in-line configuration.

The first stage compressor 102b has an inlet 105b and an outlet 106b. An inlet 107a of the second stage compressor 103a connects with the outlet 106b of the first stage compressor 102b. An inter-stage conduit 112 fluidly connects between the first stage compressor outlet 106b and the second stage compressor inlet 107a. The second stage compressor 103a has an outlet 108a. An intake conduit 153 fluidly connects between the second stage compressor outlet 108a and a combustion chamber 151.

A heat exchanger or cooler 115 is disposed in the flow path between the compression stages of the supercharger arrangement. Preferably, as shown in FIG. 4 the heat exchanger 115 has one or more cores 118. In an embodiment, the core 118 is rectilinear. As shown in FIG. 1, the conduits 111 and 112 may form part of the heat exchanger 115. Inlet 116 and outlet 117 may be fluidly connected with any coolant source such as water, oil, or air. The heat exchanger may be of any conventional design such as a plate-fin, primary surface recuperator, or tube-fin.

As shown in FIG. 1, the first and second rotor assemblies 101a and 101b are driven by respective turbines 104a and 104b, each turbine may have any type flow arrangement such as axial inlet and axial outlet, radial inlet and axial outlet, or mixed inlet and outlet. Also, multiple turbines may be used on the rotor assemblies 101a and 101b. The first and second rotor assemblies 101a and 101b may also be connected to any other drive means such as an electric drive, belt drive connected to an engine shaft, gear drive, or other conventional drive mechanisms. The first turbine 104a has an intake 109a connecting to an exhaust conduit 154 for the first combustion chamber 151. Likewise, the second turbine 104b has an intake 109b connecting with an exhaust conduit 156 for the second combustion chamber 152. Alternatively, both turbines 104a and 104b may be connected with a common manifold (not shown) connected with both the exhaust conduits 154 and 156.

The first rotor assembly 101a also includes a first rotor shaft 113a having a first rotor axis $X_1$. The first stage compressor 102a, second stage compressor 103a, and first turbine 104a are coupled to the first rotor shaft 113a for rotation about the first rotor shaft axis $X_1$. Similarly, the second rotor assembly 101b includes a second rotor shaft 113b having a second rotor axis $X_2$. The first stage compressor 102b, second stage compressor 103b, and first turbine 104b are coupled to the second rotor shaft 113b for rotation about the first rotor shaft axis $X_2$.

Figure 2:
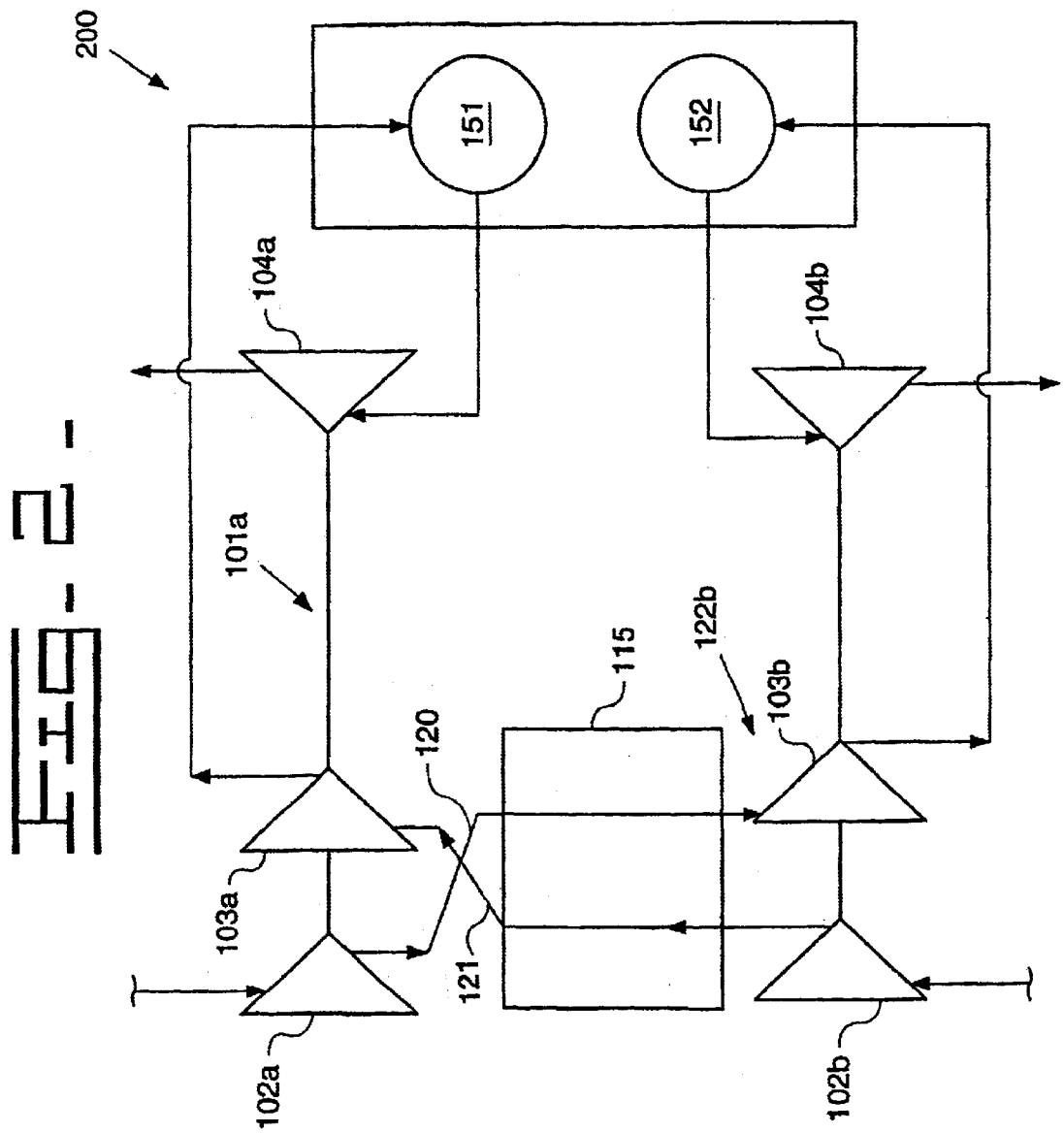
FIG. 2 is a schematic diagram of a supercharger arrangement in accordance with a second embodiment of the invention.

FIG. 2 illustrates a supercharger arrangement 200 in accordance with a second embodiment having several features in common with the first embodiment of FIG. 1 and with like parts identified by the same reference numerals. However, one difference between the two embodiments is that, in the second embodiment, the two turbines 104a and 104b are disposed on the same side of the supercharger arrangement 200. Furthermore, the inter-stage conduit 120 between the first stage compressor 102a (first compressor) and the second stage compressor 103b (fourth compressor) (which is now mounted on a second rotor assembly 122b) crosses over the inter-stage conduit 121 between the first stage compressor 102b (third compressor)(which is now mounted on the second rotor assembly 122b) and the second stage compressor 103a (second compressor). This cross over occurs preferably before the inter-stage flows pass through the heat exchanger 115 or after these flows exit the heat exchanger 115, thereby permitting the use of a heat exchanger with relatively simple parallel flow paths. However, the cross over may also occur within the heat exchanger 115.

Figure 3:
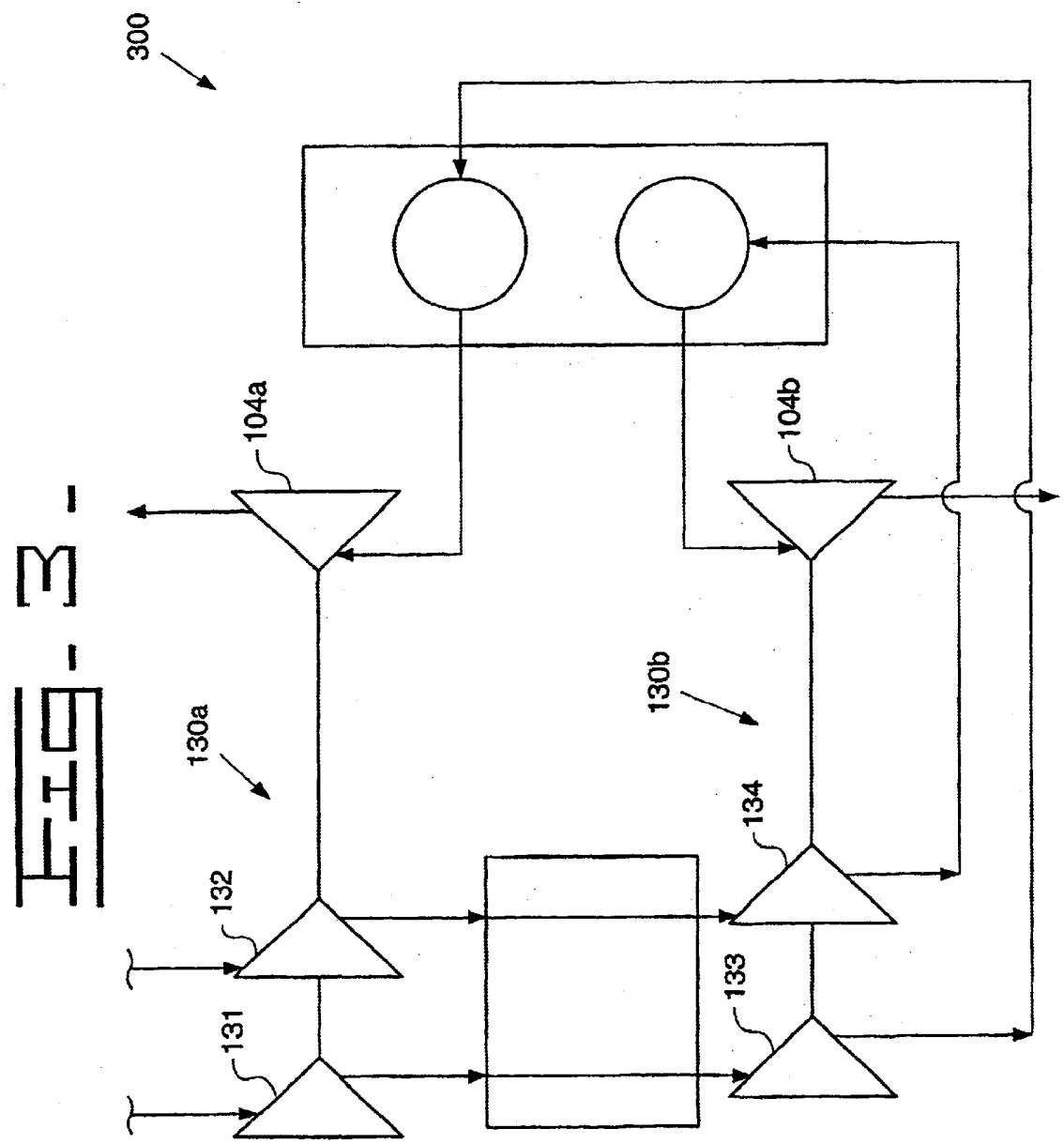
FIG. 3 is a schematic diagram of a supercharger arrangement in accordance with a third embodiment of the invention.

FIG. 3 illustrates a supercharger arrangement 300 in accordance with a third embodiment having several features in common with the first two embodiments of FIGS. 1 and 2 and with like parts identified by the same reference numerals. However, in the embodiment of FIG. 3, each rotor assembly has two compressors of the same stage. That is, the first rotor assembly 130a has the first stage compressor 131 (first compressor) and the first stage compressor 132 (second compressor). The second rotor assembly 130b has the second stage compressor 133 (fourth compressor) and the second stage compressor 134 (third compressor). Additionally, as with the embodiment in FIG. 2, the turbines 104a and 104b in FIG. 3 are shown disposed on the same side of the supercharger arrangement 300. However, these turbines may also be disposed on opposites of the supercharger arrangement 300.

While not shown in the figures, the supercharger arrangement in accordance with the invention may include devices for controlling the first and second stage boost pressures to optimize the supercharger arrangement's overall performance and protect against negative impacts on the supercharger arrangement. Such control devices as a waste gate, valving, variable nozzle, or variable vanes using various actuator types such as pneumatic, hydraulic, or electronic. Also, each supercharger arrangement may include additional compression stages.

INDUSTRIAL APPLICABILITY

In a vehicle powered by a combustion engine 150, a multi-stage supercharger arrangement 100, 200, 300 in accordance with the invention is used to provide boost pressure. According to one embodiment, the compressor 102a increases air to pressure P1 and feeds air to compressor 103b where air pressure increases to P2. Similarly, the compressor 102b compresses air to P3 and feeds air to compressor 103a which raises air to pressure P4. The heat exchanger 115 cools the flow of air between compression stages. Using the external heat exchanger allows the supercharger arrangement 100, 200, 300 to be sized separately.

The second stage compressors 103a and 103b feed the air compressed to the final boost pressure to the cylinders 151 and 152 of the combustion engine 150. The exhaust gas from the cylinders 151 and 152 is fed to the first and second turbines 104a, 104b to drive these turbines and, thereby drive the respective rotor assemblies. In a preferred embodiment, each second stage compressor feeds half the cylinders of the combustion engine 150. Furthermore, each turbine 104a and 104b is driven by the flow of exhaust gas from half the cylinders of the combustion engine 150.

Further, the external heat exchanger 115 allows the heat exchanger to have rectilinear flow passageways having large cross-sectional areas. Moreover, primarily because of the more uniform air flow characteristics through the heat exchanger 115, there is improved distribution and more complete use of the heat exchanger's full surface area. Additionally, the supercharger arrangement with a rectilinear heat exchanger can be made into a compact package, because heat exchanger may fit between the rotor assemblies, rather than fully encircling each.

Using the inter-stage conduits 111, 112, 120, and 121, overall mass flow through the rotor assemblies 101a, 101b, 122b, 130a, and 130b is balanced. Looking at embodiments of FIGS. 1 and 2, the mass balance is further enhanced by having similar forces on the rotor assemblies 101a, 101b, and 122b so long as the respective turbines 104a and 104b receive similar exhaust flows. Even with uneven exhaust flows, exposure to both rotor assemblies 101a and 101b or 122b will result in final output from the second stage compressors 103a and 103b being closer than without the inter-stage conduits 111, 112, 120, and 121.

Other aspects, objects and advantages of the present invention can be obtained from a study of the drawings, the disclosure and the appended claims.

What is claimed is:

1. A supercharger arrangement, comprising:
    a first compressor and a second compressor in parallel fluid relation and rotatably coupled by a first rotor assembly;
    a third compressor and a fourth compressor in parallel fluid relation and rotatably coupled by a second rotor assembly; and
    a first inter-stage conduit fluidly connecting a compressor outlet of said first compressor and a compressor inlet of said fourth compressor.

2. The supercharger arrangement according to claim 1, including a heat exchanger in communication with said first inter-stage conduit.

3. The supercharger arrangement according to claim 2, wherein said heat exchanger includes a rectilinear core.

4. The supercharger arrangement according to claim 1, wherein said first rotor assembly includes a first rotor shaft connecting with a first turbine; and
    wherein said second rotor assembly includes a second rotor shaft connecting with a second turbine.

5. The supercharger arrangement according to claim 1, wherein said first compressor has an axial compressor inlet.

6. The supercharger arrangement according to claim 1, wherein said first compressor has a radial compressor outlet.

7. A supercharger arrangement, comprising:
    a first rotor assembly including a first compressor and a second compressor;
    a second rotor assembly including a third compressor and a fourth compressor;
    a first inter-stage conduit fluidly connecting a compressor outlet of said first compressor and a compressor inlet of said fourth compressor; and
    a second inter-stage conduit fluidly connecting a compressor outlet of said third compressor and a compressor inlet of said second compressor.

8. The supercharger arrangement according to claim 7, including a heat exchanger in communication with said first inter-stage conduit and said second inter-stage conduit.

9. The supercharger arrangement according to claim 8, wherein said first compressor and said third compressor are first stage compressors, and said second compressor and said fourth compressor are second stage compressors.

10. The supercharger arrangement according to claim 8, wherein said first compressor and said second compressor are first stage compressors, and said third compressor and said fourth compressor are second stage compressors.

11. A supercharged engine, comprising
    a combustion chamber;
    an intake conduit fluidly connecting with said combustion chamber;
    at least one exhaust conduit in fluid communication with said combustion chamber;
    a first rotor assembly including a first compressor and a second compressor;
    a second rotor assembly including a third compressor and a fourth compressor;
    a first turbine being connected with said first rotor assembly and fluidly connecting with one of said at least one exhaust conduit;
    a second turbine being connected with said second rotor assembly and fluidly connecting with one of said at least one exhaust conduit; and
    a first inter-stage conduit fluidly connecting a compressor outlet of said first compressor and a compressor inlet of said fourth compressor.

12. The supercharged engine according to claim 11, including a second inter-stage conduit fluidly connecting a compressor outlet of said second compressor and a compressor inlet of said third compressor.

13. The supercharged engine according to claim 12, including a heat exchanger connecting with said first inter-stage conduit and said second inter-stage conduit.

14. The supercharged engine according to claim 13, wherein said heat exchanger has a rectilinear core.

15. The supercharged engine according to claim 13, wherein said heat exchanger is connected with a coolant source.

16. A method of compressing gas, comprising:
    compressing a first gas in a first compression stage using a first compressor;
    further compressing the first gas in a second compression stage using a fourth compressor;
    compressing a second gas in a first compression stage using a third compressor;
    further compressing the second gas in a second compression stage using a fourth compressor;
    driving said first compressor and said second compressor; and cooling said first gas between the first and second compression stages and cooling said second gas between the first and second compression stages.

17. The method according to claim 16, including moving the first gas out of a housing of the first compressor.

18. The method according to claim 16 wherein said driving step includes connecting said first compressor and said second compressor to a turbine driven by exhaust gas.

* * * * *